(12) United States Patent
Perrea et al.

(10) Patent No.: US 9,612,150 B2
(45) Date of Patent: Apr. 4, 2017

(54) LOAD CELL WEIGH MODULE HAT LIMITS HORIZONTAL FLOATING MOVEMENT OF THE TOP PLATE

(71) Applicant: Mettler-Toledo AG, Greifensee (CH)

(72) Inventors: Michael Perrea, Columbus, OH (US); Eric Boggs, Galena, OH (US); Tom Leahy, Nenagh (IE); Zhang Ping, Jiangsu (CN)

(73) Assignee: Mettler-Toledo GmbH, Greifensee (CH)

( * ) Notice: Subject to any disclaimer, the term of this patent is extended or adjusted under 35 U.S.C. 154(b) by 84 days.

(21) Appl. No.: 14/427,697

(22) PCT Filed: Mar. 6, 2013

(86) PCT No.: PCT/EP2013/054491
§ 371 (c)(1),
(2) Date: Mar. 12, 2015

(87) PCT Pub. No.: WO2014/044413
PCT Pub. Date: Mar. 27, 2014

(65) Prior Publication Data
US 2015/0226601 A1    Aug. 13, 2015

(30) Foreign Application Priority Data

Sep. 19, 2012  (CN) .......................... 2012 1 0349792

(51) Int. Cl.
*G01G 21/23*   (2006.01)
*G01G 23/02*   (2006.01)
*G01G 23/00*   (2006.01)

(52) U.S. Cl.
CPC ........... *G01G 23/005* (2013.01); *G01G 21/23* (2013.01); *G01G 23/02* (2013.01)

(58) Field of Classification Search
CPC ....... G01G 21/23; G01G 23/02; G01G 23/005
See application file for complete search history.

(56) References Cited

U.S. PATENT DOCUMENTS

| 2,714,536 A * | 8/1955 | Wirth ...................... F16C 32/02 |
| | | 177/264 |
| 3,915,248 A * | 10/1975 | Paelian .................. G01G 21/23 |
| | | 177/21 OR |

(Continued)

FOREIGN PATENT DOCUMENTS

| CN | 201047775 Y | 4/2008 |
| CN | 201803775 U | 4/2011 |

(Continued)

*Primary Examiner* — Randy Gibson
(74) *Attorney, Agent, or Firm* — Standley Law Group LLP

(57) ABSTRACT

A weigh module (1) includes a load cell (2), a base plate (3), a top plate (6), a force-transmitting member (8) serving to transmit the weighing force from the top plate (6) to the load cell (2), and movement-restricting means (9, 10) which serve to limit the horizontal floating movement of the top plate (6) relative to the base plate (3) within a confined range of free play and to transmit lateral force components directly from the top plate (6) to the base plate (3). One part of the movement-restricting means (9, 10) has the form of a channel whose top edges (11) are rigidly connected to the top plate (6) and whose flat bottom extends parallel to the base plate (3) at a clear distance from the latter. The other part of the movement-restricting means (9, 10) is a bolt whose shaft (15) is anchored in the base plate (3) and passes with all-around clearance through a passage (14) in the channel bottom (13), and whose head (16) is larger than the passage (14) and arranged above the channel bottom (13) with a vertical clearance gap from the latter.

14 Claims, 4 Drawing Sheets

(56) References Cited

U.S. PATENT DOCUMENTS

| | | | |
|---|---|---|---|
| 3,997,014 A | 12/1976 | Soderholm et al. | |
| 4,540,057 A * | 9/1985 | Freeman | G01G 3/1414 |
| | | | 177/154 |
| 4,669,558 A * | 6/1987 | Backu | G01G 21/23 |
| | | | 177/187 |
| 4,804,053 A * | 2/1989 | Nordstrom | G01G 3/1408 |
| | | | 177/211 |
| 4,815,547 A | 3/1989 | Dillon et al. | |
| 4,880,069 A * | 11/1989 | Bradley | G01G 19/44 |
| | | | 177/211 |
| 5,029,483 A * | 7/1991 | Gautschi | G01G 19/44 |
| | | | 73/172 |
| 5,308,934 A * | 5/1994 | Miller | G01G 21/23 |
| | | | 177/128 |
| 5,566,575 A * | 10/1996 | Will | G01G 3/1408 |
| | | | 177/255 |
| 5,600,104 A * | 2/1997 | McCauley | G01G 19/12 |
| | | | 177/136 |
| 6,320,142 B1 * | 11/2001 | Burton | G01G 21/23 |
| | | | 177/126 |
| 6,331,682 B1 | 12/2001 | Hopkins et al. | |
| 6,340,799 B1 * | 1/2002 | Hama | G01G 21/23 |
| | | | 177/184 |
| 6,849,807 B2 * | 2/2005 | Casey | B60N 2/0705 |
| | | | 177/144 |
| 6,912,920 B2 * | 7/2005 | Fortune | B60N 2/002 |
| | | | 73/862.044 |
| 7,297,880 B2 * | 11/2007 | Sulkowski | B60R 21/01516 |
| | | | 177/136 |
| 7,361,852 B2 * | 4/2008 | Leahy | G01G 21/06 |
| | | | 177/229 |
| 7,371,978 B2 * | 5/2008 | Leahy | G01G 21/23 |
| | | | 177/238 |
| 2004/0226759 A1 * | 11/2004 | Desire | G01G 23/02 |
| | | | 177/154 |
| 2006/0180360 A1 * | 8/2006 | Sikula | G01G 21/23 |
| | | | 177/201 |
| 2013/0153307 A1 * | 6/2013 | Van De Vliet | G01G 21/23 |
| | | | 177/225 |

FOREIGN PATENT DOCUMENTS

| | | |
|---|---|---|
| CN | 203241129 U | 10/2013 |
| DE | 19918408 A1 | 10/2000 |
| DE | 10138435 A1 | 1/2002 |
| EP | 1785704 A1 | 5/2007 |

* cited by examiner

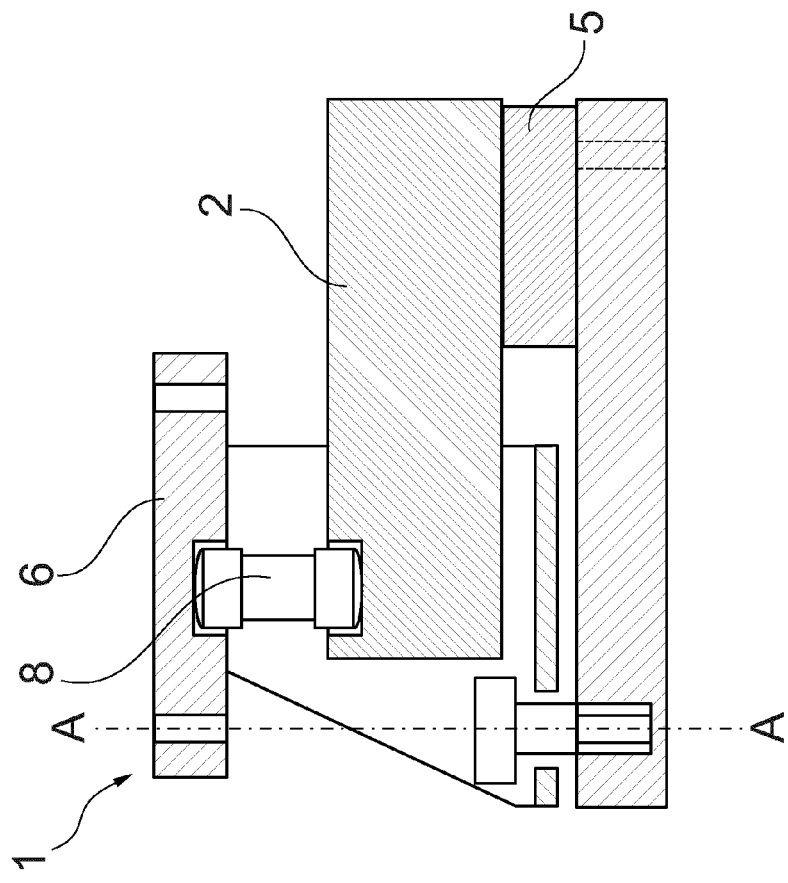
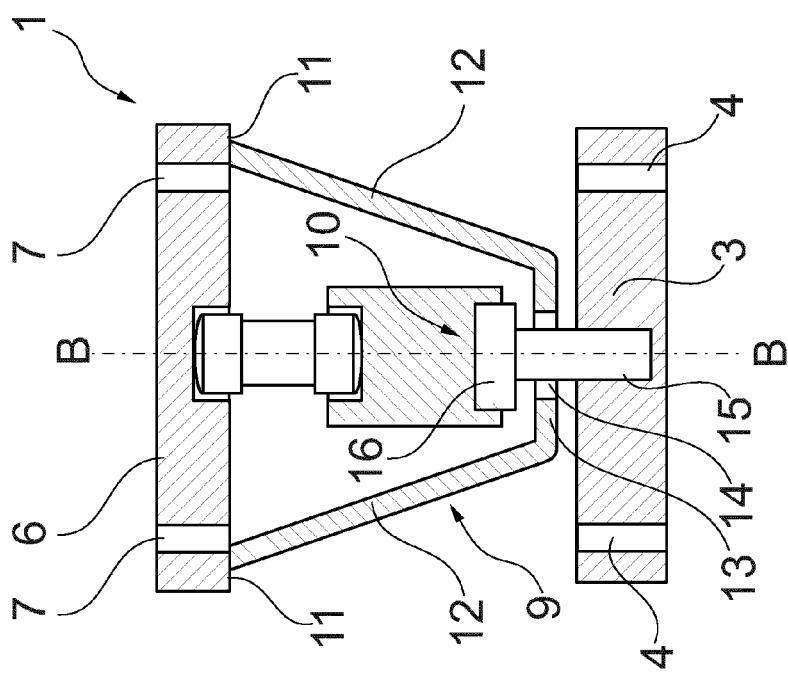

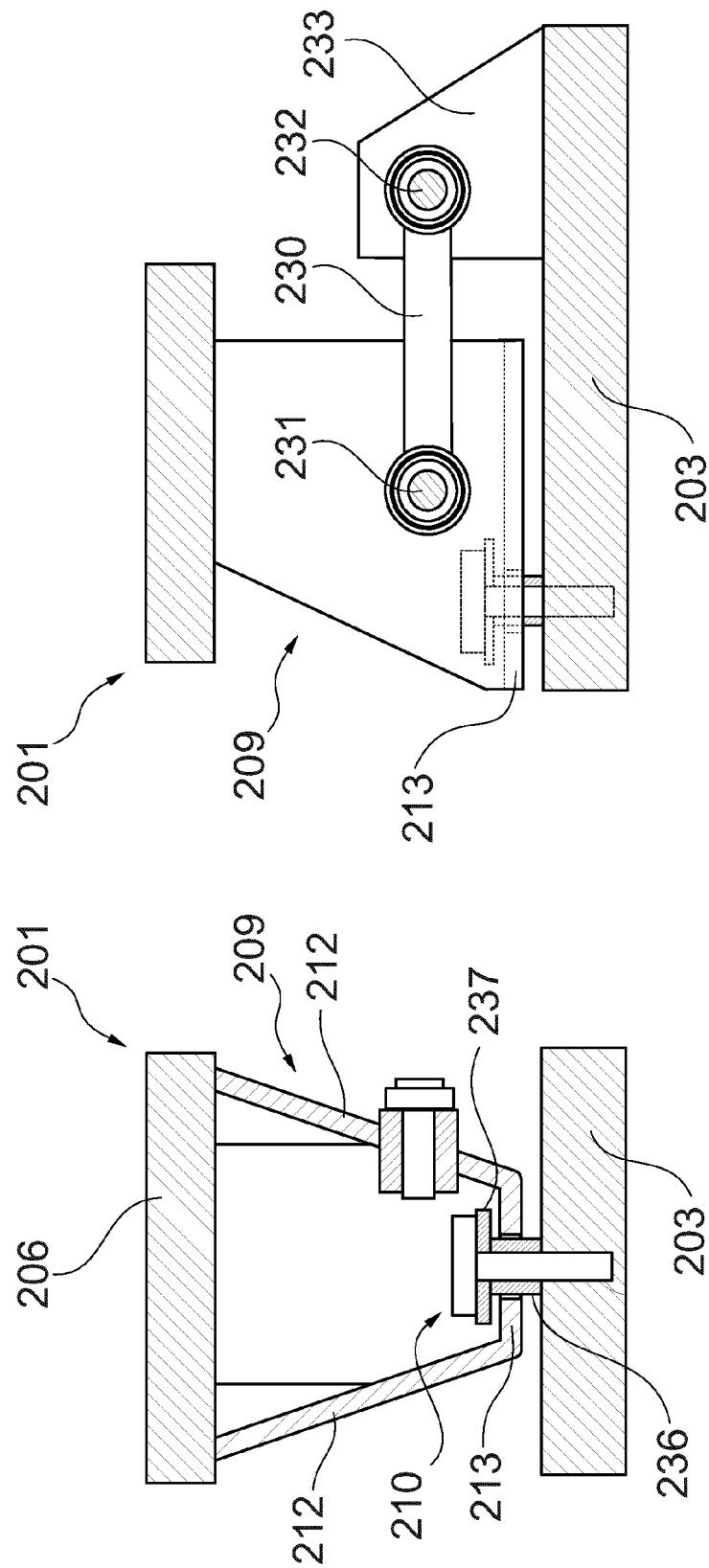

LOAD CELL WEIGH MODULE HAT LIMITS HORIZONTAL FLOATING MOVEMENT OF THE TOP PLATE

BACKGROUND OF THE INVENTION

The invention concerns a weigh module for installation in a weighing scale of the kind where a weighing load carrier such as for example a platform, a tank, a hopper, or a belt conveyor is supported by a plurality of weigh modules, wherein each weigh module contains a load cell and the weight of a load on the weighing load carrier is determined by summation of the individual load cell signals.

A conventional weigh module includes a base part that can be bolted to a foundation or support structure, a top part that can be bolted to the weighing load carrier, a load cell that is fastened to the base part, and a force-transmitting member which is arranged between the top part and the load cell and serves to introduce the weighing force from the top part into the load cell. The function of the weigh module is to ensure that only the substantially vertical weight force that is to be measured is received by the load cell, while laterally directed forces and/or relative displacements between the top part and the base part which could harm the load cell or compromise the weight measurement are prevented from reaching the load cell.

In an installation of this kind, lateral forces or relative displacements between the top parts and the bases of the weigh modules can arise for example as a result of different thermal expansions of the weighing load carrier and the foundation or support structure, deformation of the weighing load carrier caused by the weighing load, seismic shifts, wind forces, braking and acceleration of vehicles on a vehicle scale, and other forces originating from inside or outside the weighing scale.

To protect the load cell from having to absorb lateral forces and/or displacements, the force-transmitting member may be configured, for example, as a so-called rocker pin, a construction element generally known to those of ordinary skill in the relevant art. Arranged in vertical orientation between the top part and a load-introduction area or -element of the load cell, a rocker pin transmits a force along its longitudinal axis while essentially yielding to transverse forces and displacements of the top part, resisting such forces and displacements only through its inherent but very limited capability to maintain and/or restore its vertical orientation. Besides rocker pins, the state of the art also includes force-transmitting members in which a self-righting resilience is achieved in different ways, for example by inserting elastomeric pads in the contact zones where the upper and lower end of the force-transmitting member meet, respectively, the top part of the weigh module and the force-introduction zone of the load cell.

To absorb transverse forces and displacements that exceed the limited position-restoring ability of the force-transmitting member, weigh modules normally include means to restrict or constrain the freedom of lateral movement of the top part in relation to the base part. A movement-restricting means is generally of the nature of a solid boundary which confines movement of the top part relative to the base part in any horizontal direction to a limited zone of free play and is strong enough to withstand horizontal forces within given design specifications.

The restricting means may further be designed with the capability to stop vertical upward movement of the top part and thus to prevent the weighing load carrier (which is fastened to the top part) from being lifted off the base, for example by wind forces. Finally, the restricting means may include a stop to prevent an excessive downward drop of the weighing load carrier in case of a mechanical collapse of the load cell.

In addition to the restricting means in the form of movement-stopping boundaries, a weigh module may also include constraints, for example in the form of horizontal checkrods linking the top part to the bottom part and thereby inhibiting any linear movement of the top part relative to the base part in the direction of the checkrod.

However, in an arrangement of weigh modules that are thus constrained in one or two horizontal directions, care must be taken to avoid over-constraints. For example, a platform scale with four weigh modules could have three weigh modules with one checkrod each and a fourth weigh module without checkrod, arranged in such a way that no two of the checkrods are collinear with each other.

The actual arrangement and configuration of the aforementioned generic elements in a weigh module depends to a large extent on the type of load cell, the primary distinction being between so-called canister load cells and cantilever beam load cells. A canister load cell generally has the shape of an upright cylinder whose bottom is fastened to the base plate of the weigh module. The weighing force is directed substantially along the axis of the cylinder and is applied to a so-called load button at the center of the top surface of the upright cylinder.

A variant of the canister load cell, the so-called rocker pin load cell likewise has the form of an upright cylinder. However, both the top and bottom are spherically shaped rocker surfaces. Installed in a weigh module, this load cell is arranged like a rocker pin between the top part and the base part of the weigh module. In other words, the rocker pin load cell combines the functions of load cell and force-transmitting member in one integral unit.

In contrast to the canister load cell or the rocker pin load cell, a cantilever beam load cell is basically configured as a horizontal beam which, when installed in a weigh module, is at one end solidly connected to the base of the weigh module while the opposite, free end of the cantilever beam receives the weighing load from the top part of the weigh module by way of a force-transmitting member.

The following examples of the state of the art illustrate specific embodiments of the foregoing generic concepts of weigh modules.

A weigh module according to U.S. Pat. No. 6,331,682 has a base part and a top part in the form of flat plates with mounting holes for their attachment to a foundation or support structure and to a weighing load carrier such as a tank or a platform. The load cell in this weigh module is configured as a canister load cell, and the force-transmitting member is configured as a rocker pin. Movement-restricting means are provided in the form of four lower block-shaped posts rising up from the base plate on opposite sides of the load cell and two upper block-shaped posts descending downward from the top plate into interstices between the lower block-shaped posts, leaving lateral play between the upper and lower block-shaped posts. Horizontally oriented restraining pins are held with a tight fit in seating holes in the lower block-shaped posts and pass with all-around free play through clearance holes in the upper block-shaped posts. Movement of the top plate relative to the base plate is thus restricted: a.) in a horizontal x-direction by the horizontal play between pins and clearance holes; b.) in a horizontal y-direction by the lateral play between the upper and lower block-shaped posts; and c.) in a vertical z-direction (upward and downward) by the vertical play between pins and clearance holes. With more than one movement-stopping contact area in each direction, this weigh module has a design redundancy that does not appear to be justifiable. When the weigh module is pushed laterally in any given direction, the respective stop contacts cannot be expected to engage simultaneously, and their redundancy will therefore not increase the capability of the weigh module to withstand lateral forces. Also, visual inspection of all clearances appears to be rather cumbersome, and the horizontal passage holes in the block-shaped posts may be prone to collect dirt and debris which could compromise the weighing accuracy. In addition, the fabrication and assembly of six block-shaped posts and two pins gives the impression of being relatively expensive to realize in practice.

A weigh module described in U.S. Pat. No. 3,997,014 has a base part in the form of a flat plate and a top part in the form of an angle profile with a horizontal and a vertical portion, with the vertical portion having mounting holes through which the top part can be bolted sideways to a vertical surface of the weighing load carrier. The load cell in this weigh module is configured as a rocker pin load cell which performs the combined functions of load sensor and force-transmitting member as described hereinabove. Movement-restricting means are provided in the form of two vertical posts rising up from the base plate on opposite sides of the load cell and by clearance holes in the horizontal portion of the angular top part, wherein the upper extremities of the vertical posts reach into the clearance holes with lateral play, thus performing the lateral movement-restricting function. Like the preceding example, this weigh module again has redundant movement-stopping elements whose contributions in absorbing horizontal forces may not necessarily be additive. Besides, free-standing cylindrical posts do not appear to be the most efficient design for the absorption of transverse forces.

A weigh module according to DE 199 18 408 A1 has a base part and a top part in the form of flat plates, with a rocker pin load cell transmitting and simultaneously measuring the weighing force between the top plate and the base plate. Also mentioned in this reference is the possibility of using elastomeric bearings rather than spherical rocker surfaces for the introduction of the weighing force and its equal and opposite reaction force into the load cell. A first movement-restricting part is provided in the form of a massive cylindrical bumper post rising up from the base plate and carrying at the top a rectangular plate. A second movement-restricting part has the form of an angular profile descending from the top plate. The corner ends of the rectangular plate reach into cutouts of the angular profile, wherein the clearances between the projections and the edges of the cutouts delimit the free movement of the top part relative to the base part in an x-direction towards (but not away from) the load cell and both ways in the y-direction perpendicular to the x-direction. Full restriction of horizontal movement in all directions is achieved by orienting the individual way modules of an installation appropriately, so that their respective movement-blocking capabilities complement each other. An area of concern with this weigh module would be the cost and feasibility of connecting the massive post to the base plate, the rectangular plate to the post, and the angular profile to the top plate either by welding or by means of screw bolts.

An example of a weigh module with a lateral constraint in the form of one horizontal checkrod is illustrated in FIG. 2 of DE 101 38 435 A1. By linking the top part to the bottom part, the checkrod inhibits linear movement of the top part relative to the base part in the direction of the checkrod. Horizontal movements transverse to the direction of the checkrod are limited within a range of free play between a first and a second part of a movement-restricting means. As mentioned above, by arranging three such weigh modules with their checkrods oriented along non-collinear axes, it is possible to build a weighing scale without loose play between the weighing load carrier and the supporting base while at the same time avoiding over-constraints that would introduce lateral forces into the load cells. In a scale with more than three weigh modules, one would simply omit the checkrod from the fourth and any further weigh modules used in the installation. This weigh module, too, suffers from the drawback of being complicated and expensive to realize in practice. A welded table-like structure which forms a first movement-restricting part rises from the base plate to within a narrow distance of the top plate, while separate holder brackets for the bearings of the checkrod are also welded to the base plate and the top plate, respectively.

OBJECT OF THE INVENTION

In view of the shortcomings of the prior art, particularly the complexity and expense involved in manufacturing weigh modules according to the proposed concepts, it is therefore the object of the present invention to create a load cell weigh module that offers superior structural strength in withstanding lateral as well as vertical forces, allows improved visual inspection of all clearances, and reduces the potential for accumulation of dirt and debris that could compromise weighing accuracy, while being at the same time simple and cost-effective to manufacture as well as easy to transport, to install and to maintain.

The invention is particularly directed—but not limited—to a weigh module that accommodates a cantilever beam load cell, and further to a weigh module that can be equipped with a checkrod.

SUMMARY OF THE INVENTION

A weigh module according to the present invention includes:
  a load cell,
  a substantially flat base plate on which the load cell is mounted and which serves to connect the weigh module to a foundation or understructure,
  a substantially flat top plate which serves to connect the weigh module to a weighing load carrier such as for example a weighing platform or a weighing tank,
  a force-transmitting member arranged between the top plate and the load cell and serving to transmit a downward-directed and substantially vertical weighing force from the top plate to the load cell, and
  movement-restricting means which serve to limit horizontal relative movement between the top plate and the base plate within a confined range of free play and to transmit lateral force components directly from the top plate to the base plate, thereby preventing any lateral forces acting on the top plate from reaching the load cell.

In the weigh module according to the invention, the movement-restricting means include an upper movement-restricting part rigidly connected to the top plate and a lower movement-restricting part rigidly connected to the base plate. In particular, the upper movement-restricting part has the form of a channel with side walls whose top edges are attached to the top plate, and with a flat channel bottom extending parallel to the base plate at a clear distance from the latter. The lower movement-restricting part is formed by an upright bolt, whose shaft passes with all-around clearance through a passage in the channel bottom and is anchored in the base plate. The bolt has a head that is larger than the passage and, in the installed position of the bolt, is located at a clear distance above the channel bottom. Thus, relative movement between the top plate and the base plate is restricted in any lateral direction, as the bolt shaft is stopped by the boundary of the passage in the channel bottom. Lift-off of the top plate, for example due to wind forces, is restricted as the border area of the channel bottom opening is stopped by the bolt head, while downward collapse of the weigh module, for example due to mechanical failure of the load cell, is prevented as the base plate stops the downward movement of the channel bottom.

In a preferred embodiment of the weigh module according to the invention, the upper movement-restricting part is made of plate material and receives its profile shape by bending the channel sides up from the channel bottom.

Preferably, the top edges of the channel sides are connected to the top plate by welding.

The preferred profile shape for the channel of the upper movement-restricting part is a symmetrical trapezoid with a greater width between the top edges than across the flat channel bottom. In particular the trapezoidal shape provides more structural strength against lateral forces directed perpendicular to the bending folds between the channel bottom and channel sides.

The structural strength against lateral forces directed perpendicular to the bending folds between the channel bottom and channel sides is further enhanced in an embodiment where stiffening profiles are impressed in the channel sides.

The bolt which forms the lower movement-restricting part can run through a tubular bushing with a bushing collar, wherein the bushing has a smaller diameter and the bushing collar has a larger diameter than the passage in the trapezoidal channel, so that there is an all-around lateral clearance gap between the bushing and the rim of the passage and an upward vertical clearance gap between the bushing collar and the channel bottom. The tubular bushing with the bushing collar thus serves to precisely define the range of vertical movement of the upper movement-restricting part relative to the lower movement-restricting part, and it also serves as a spacer block against which the bolt can be tightened.

The force-transmitting member is preferably a rocker pin which is arranged in a substantially vertical position between the top plate and the load cell. The upper end of the rocker pin is in compressive, force-transmitting contact with a load-bearing element of the top plate and the lower end of the rocker pin is in compressive, force-transmitting contact with a load-receiving element of the load cell.

The load cell in preferred embodiments of the weigh module according to the invention can be a cantilever load cell with a mounting portion rigidly attached to the base plate, with a cantilever arm extending in a substantially horizontal direction from the mounting portion, and with a load-receiving portion arranged at the free end of the cantilever arm.

Furthermore, in preferred embodiments of the weigh module according to the invention with a cantilever load cell, the cantilever arm reaches with all-around clearance into the space that is enclosed between the top plate, the channel sides and the channel bottom.

A further preferred embodiment of the weigh module according to the invention includes a constraint in the form of a horizontal checkrod, wherein one end of the checkrod is pivotally connected to a first swivel bearing incorporated in one of the channel sides and the other end of the checkrod is pivotally connected to a second swivel bearing incorporated in a post that is mounted on the base plate.

In contrast to restricting means which allow relative movement between the top plate and the base plate within defined narrow limits, a checkrod absolutely inhibits movement in the direction of its own longitudinal axis. In other words, a checkrod removes one degree of freedom from the mobility of the top plate relative to the base plate.

A weigh module according to the invention may further include an immobilizer device which, for transport and installation of the weigh module, is interposed between the upper movement-restricting part and the base plate and secures the position of the upper movement-restricting part relative to the base plate. In the operating state of the weigh module, the immobilizer device is taken out. Equipping the weigh module with an immobilizer device has proven to be advantageous in that it allows the weigh module to be installed without a load cell while maintaining proper relative positioning between the top plate and the base plate. Thus the weigh module can be installed at one time and the load cell at a later time. It also allows the weigh module to be used as an inactive stand when the load cell is removed for servicing or replacement.

BRIEF DESCRIPTION OF THE DRAWINGS

The invention is hereinafter described through preferred embodiments as illustrated in the accompanying drawings, wherein:

FIG. 1 shows a weigh module according to the invention with a cantilever beam load cell seen (1A) in transverse cross-section and (1B) in a longitudinal section;

FIG. 3 shows a weigh module according to the invention equipped with a checkrod seen in transverse cross-section (3A) and in a side elevation drawing (3B);

DETAILED DESCRIPTION OF THE INVENTION

Figure 4:
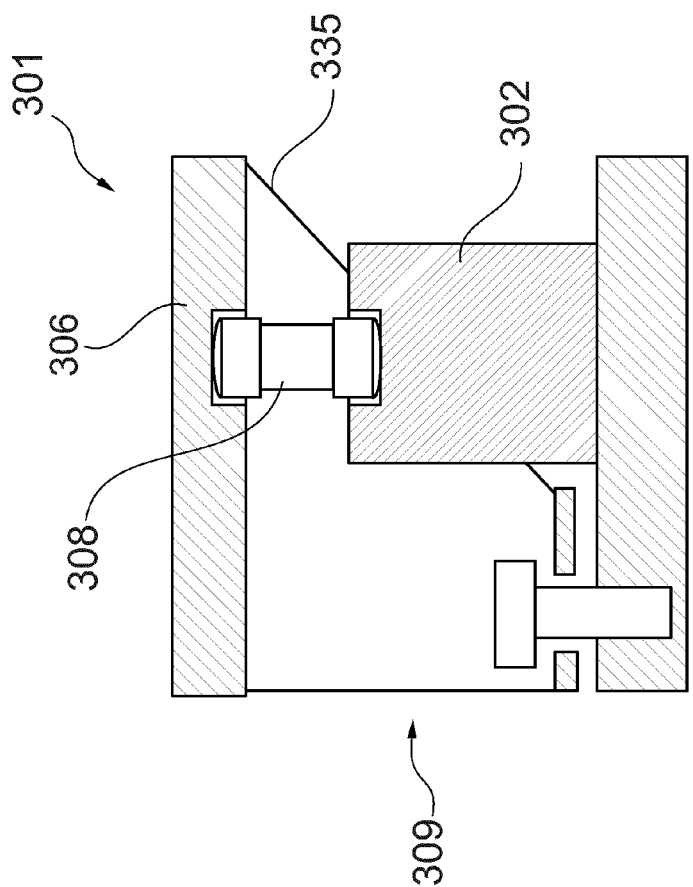
FIG. 4 shows a weigh module according to the invention in a configuration that is adapted to a canister type load cell.

FIGS. 1A and 1B show sectional views of a weigh module 1 with a cantilever load cell 2. FIG. 1A represents a cross-section in a plane A-A as indicated in FIG. 1B, i.e. transverse to the beam direction of the cantilever load cell 2. FIG. 1B represents a longitudinal section in a plane B-B as indicated in FIG. 1A, i.e. a vertical plane bisecting the cantilever load cell 2 in the lengthwise direction. The weigh module 1 has a base plate 3 with mounting holes 4 allowing the base plate to be bolted to a foundation or support structure (not shown in the drawing). The cantilever load cell 2, outlined here in the shape of a rectangular slab which is typical of so-called shear beam load cells, is rigidly mounted on the base plate 3, vertically elevated from the latter by a spacer block 5. The weigh module 1 further has a top plate 6 with mounting holes 7 that allow the top plate 6 to be bolted to a weighing load carrier such as a weighing platform or a weighing tank (not shown in the drawing). A force-transmitting member 8, shown here in the form of a rocker pin, is arranged between the top plate 6 and the load cell 2 to transmit a substantially vertical, downward-directed weighing force from the top plate 7 to the load cell 2. The function of the rocker pin 8 is to provide a so-called "floating" support of the top plate 7 on the load cell 2, wherein no horizontal force-components are transmitted to the load cell. Movement of the top plate 7 relative to the base plate 3 is restricted by movement-restricting means 9, 10 constituted by an upper movement-restricting part 9 connected to the top plate 7 and a lower movement-restricting part 10 connected to the base plate 3. In the view of FIG. 1A, the upper movement-restricting part 9 presents the profile of a trapezoidal channel which is wider between the top edges 11 of the channel sides 12 than across the channel bottom 13. The channel-shaped upper movement-restricting part 9 is typically formed of plate material and is attached to the top plate 7 by weld seams along the top edges 11. The channel bottom 13, which contains a round passage 14, extends parallel to the base plate 3 at a clear distance from the latter. The lower movement-restricting part 10 has the form of a bolt 15, 16 with a bolt shaft 15 which is anchored in the base plate 3 and passes through the passage 14 with an all-around circular clearance gap between the bolt shaft 15 and the rim of the passage 14. The bolt head 16, which is larger in diameter than the passage 14, is located at a clear distance above the channel bottom 13. The aforementioned circular clearance gap and the clear distances in the upward and downward direction, typically of the order of a few millimeters, limit the range of the horizontal floating movement of the top plate 7 and also restrict vertical upward and downward movement to prevent lift-off as well as a catastrophic drop of a load carrier supported by three or more weigh modules 1.

In combination with a cantilever load cell 2, the inventive concept of the upper movement-restricting part 9 as a channel has a particular advantage that it leads to a very compact design of the weighing module 1, with the cantilever arm of the load cell reaching into the space delimited by the channel profile. Furthermore, the position of the bolt 15, 16 near the front end of the weigh module 1 (see FIG. 1B) provides ideal visibility to inspect the required all-around clearance between the bolt 15, 16 and the passage 14 and to detect possible accumulations of dirt and debris which could compromise the functioning of the weighing apparatus in which the weigh module is installed.

Figure 2:
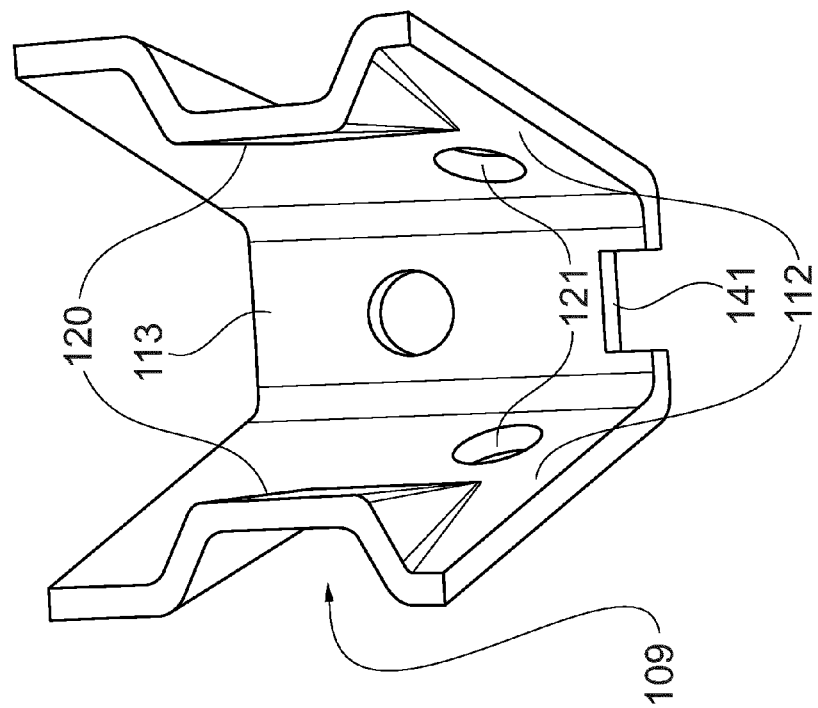
FIG. 2 shows a perspective view of an embodiment of the upper movement-restricting part with press-formed stiffener profiles.

FIG. 2 shows a perspective view of a channel-shaped upper movement-restricting part 109 in which the channel sides 112 include press-formed stiffening profiles 120. This increases the strength of the upper movement-restricting part 109 to withstand lateral forces particularly in the direction transverse to the channel. The holes 121 in the channel sides 112 serve to hold swivel bearings for checkrods, which will be explained in FIG. 3. The function of the rectangular cutout 141 in the channel bottom 113, which is also present as cutout 441 in the channel bottom 413 of FIG. 5A, will be explained in the context of FIG. 5.

FIG. 3A shows a sectional view and FIG. 3b shows a side view of a weigh module 201 analogous to FIGS. 1A, and 1B, wherein the load cell has been omitted for better clarity. The weigh module 201 is equipped with a checkrod 230 which is connected through swivel bearings 231, 232, respectively, to the upper movement-restricting part 209 and to a post 233 that is solidly connected to the base plate 203. The checkrod 230 constrains the top plate 206, and thus a load carrier connected to the latter, from moving in the longitudinal direction of the checkrod 230. Of course, there could also be checkrods 230 arranged in parallel on both sides of the upper movement-restricting part 209. Although an arrangement with three checkrod-equipped weigh modules 201 will positively constrain any horizontal floating movement of a load carrier, the lower movement-restricting part 210 is still required to prevent the top plate 206 from lifting off, for example in case of an earthquake or strong wind forces.

As the weigh module 301 in FIG. 4 illustrates, the invention is not limited to weigh modules with a cantilever load cell. To accommodate a canister load cell 302, the channel profile of the upper movement-restricting part 309 is cut off at an appropriate angle at the edge 335 that faces towards the load cell 302, while all other parts can remain identical. As a further alternative, the arrangement of a canister load cell 302 with a rocker pin 308 shown in FIG. 4 could also be replaced by a so-called rocker pin load cell (not shown in the drawings).

Figure 5B:
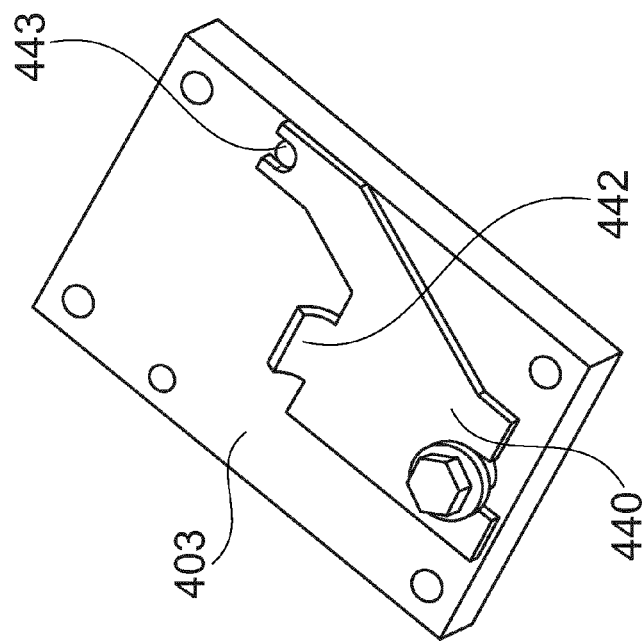
FIG. 5 shows a weigh module according to the invention with an immobilizer device in a side elevation drawing (5A), and the base plate with the immobilizer device in a perspective view (5B).
Figure 5A:
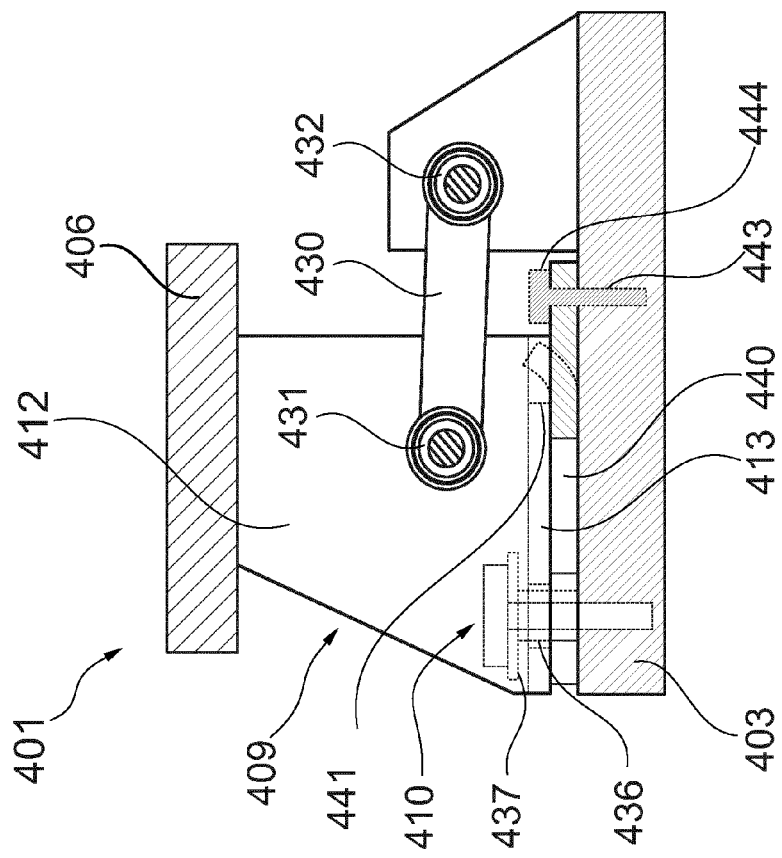

FIG. 5A shows an example of an immobilizer device in the form of a shim plate 440 which is inserted between the base plate 403 and the channel bottom 413 of a weigh module of the same embodiment as in FIG. 3. As is evident from the slightly inclined position of the checkrod 430, the shim plate 440 is thicker than the height of the air gap which exists between the channel bottom 413 and the base plate 403 when the weigh module 401 is in its operating state. Thus the channel bottom 413 is pushed up against the collar 437 of the bushing 436.

For better clarity, FIG. 5B gives an open view of the shim plate 440 in its normal position on the base plate 403. At the front end (relative to the view of FIG. 5B) the shim plate 440 has a cutout that embraces the bushing 436. The end of an arm of the shim plate 440 extending to the rear has another cutout which serves to secure the shim plate 440 on the base plate 403 by installing a bolt 444 (FIG. 5A) in a threaded hole 443 of the base plate 403. An upward-bent tongue 442 of the shim plate 440 fits precisely into a conforming cutout 441 of the channel bottom 413 (shown more clearly as cutout 141 in the channel bottom 113 of FIG. 2), whereby the upper movement-restricting part 409 with the top plate 406 is secured against movement in the direction transverse to the channel, while movement in the lengthwise direction of the channel is already constrained by the checkrod 430.

As mentioned previously, an immobilizer device (for which the shim plate 440 of FIG. 5 represents a possible example) is advantageous for keeping the parts of the weigh module firmly positioned relative to each other when the weigh module is not in its operating state in a weighing apparatus, i.e. for example during transport and installation of the weigh module. With the immobilizer device in position, it is possible to install the weigh module without a load cell while maintaining proper relative positioning between the top plate 406 and the base plate 403. Thus the weigh module 401 can be installed at one time and the load cell at a later time. It can also be advantageous to re-insert the immobilizer device 440 in the weigh module 401 when the load cell is removed for servicing or replacement, so that the weigh module 401 functions as a secure stand during the inactive period of the weighing scale.

While the inventive weigh module has been described and illustrated through certain preferred embodiments, it should be evident that numerous variations could be created based on the teachings of the present invention, for example by an upside-down arrangement of the entire weigh module of FIG. 1, 3, 4 or 5 or at least parts of it, for example so that the channel is fastened to the base plate and forms the lower movement-restricting part, while the bolt is fastened to the top plate and forms the upper movement-restricting part. Accordingly, such variations are considered to be included in the invention.

LIST OF REFERENCE SYMBOLS 1, 201, 301, 401 weigh module
2, 302 load cell
3, 203, 403 base plate
4 mounting holes
5 spacer block
6, 206, 306, 406 top plate
7 mounting holes
8, 308 force-transmitting member, rocker pin
9, 109, 209, 309, 409 upper movement-restricting part
10, 210, 410 lower movement-restricting part
11 top edges
12, 112, 212, 412 channel sides
13, 113, 312, 413 channel bottom
14, 114 passage in channel bottom
15 bolt shaft
16 bolt head
120 press-formed stiffening profiles
121 holes for checkrod bearings
141, 441 cutout, recess
230, 430 checkrod
231, 232 checkrod bearings
233 post
236, 436 bushing
237, 437 collar of bushing
335 edge of 309
440 immobilizer device
442 upward-bent tongue
443 tapped hole

The invention claimed is:

1. A weigh module, comprising:
a load cell;
a base plate that is substantially flat, on which the load cell is mounted and which serves to connect the weigh module to a supporting base;
a top plate that is substantially flat, which serves to connect the weigh module to a weighing load carrier supporting a weighing load;
a force-transmitting member arranged between the top plate and the load cell and serving to transmit a downward-directed and substantially vertical weighing force from the top plate to the load cell; and
a means for restricting movement to limit horizontal relative movement between the top plate and the base plate within a confined range of free play and to transmit lateral force components directly from the top plate to the base plate, thereby preventing said lateral force components from reaching the load cell, said movement-restricting means comprising:
an upper movement-restricting part rigidly connected to the plate, the upper movement restricting part in the form of a trapezoidal channel with channel sides having top edges attached to the top plate and with a flat channel bottom containing a passage and extending parallel to the base plate at a clear distance therefrom, the trapezoidal channel having a greater width between the top edges than across flat channel bottom; and
a lower movement-restricting part rigidly connected to the base plate, comprising a bolt with a shaft and a head, the bolt being anchored in the base plate with the bolt shaft passing through said passage in the channel bottom, leaving an all-around lateral clearance gap between the bolt shaft and the passage and an upward vertical clearance gap between the bolt head and the channel bottom.

2. The weigh module of claim 1, wherein the upper movement-restricting part is made of plate material and shaped into said channel form by bending the channel sides up from the channel bottom.

3. The weigh module of claim 2, wherein the top edges of the channel sides are connected to the top plate by welding.

4. The weigh module of claim 3, wherein the channel sides comprise press-formed stiffening profiles.

5. The weigh module of claim 1, wherein the lower movement-restricting part further comprises a bushing with a bushing collar surrounding the bolt shaft, leaving an all-around lateral clearance gap between the bushing and the passage and an upward vertical clearance gap between the bushing collar and the channel bottom.

6. The weigh module of claim 1, wherein the force-transmitting member comprises a rocker pin having an upper end and a lower end, the rocker pin arranged in a substantially vertical position between the top plate and the load cell such that the upper end of the rocker pin is in compressive force-transmitting contact with a load-bearing element of the top plate and the lower end of the rocker pin is in compressive force-transmitting contact with a load-receiving portion of the load cell.

7. The weigh module of claim 1, wherein the load cell is a cantilever load cell with a mounting portion rigidly attached to the base plate, with a cantilever arm extending in a substantially horizontal direction from the mounting portion, and with a load-receiving portion arranged at a free end of the cantilever arm.

8. The weigh module of claim 7, wherein the cantilever arm reaches with all-around clearance into a space delimited by the top plate, the channel sides and the channel bottom.

9. The weigh module of claim 1, further comprising:
a first swivel bearing incorporated in one of the channel sides;
a second swivel bearing connected to the base plate; and
a checkrod, the ends of which are pivotally connected to the respective swivel bearings, serving to constrain one degree of freedom of horizontal movement of the top plate relative to the base plate.

10. The weigh module of claim 1, further comprising:
an immobilizer device which is interposed between the upper movement-restricting part and the base plate and secures the position of the upper movement-restricting part relative to the base plate during transport and installation of the weigh module, and which is subsequently removed to put the weigh module into its operating state.

11. The weigh module of claim 2, wherein the channel sides comprise press-formed stiffening profiles.

12. The weigh module of claim 1, wherein the upper movement-restricting part is made of plate material and shaped into said channel form by bending the channel sides up from the channel bottom.

13. A weigh module, comprising:
a cantilever load cell, having a mounting portion from which a cantilever arm extends in a substantially horizontal direction, with a load-receiving portion arranged at a free end of the cantilever arm;
a base plate that is substantially flat, to which the mounting portion is rigidly attached and which serves to connect the weigh module to a supporting base;

a top plate that is substantially flat, which serves to connect the weigh module to a weighing load carrier supporting a weighing load;

a force-transmitting member arranged between the top plate and the load cell and serving to transmit a downward-directed and substantially vertical weighing force from the top plate to the load cell, the force-transmitting member comprising a rocker pin having an upper end and a lower end, the rocker pin arranged in a substantially vertical position between the top plate and the load cell, such that the upper end of the rocker pin is in compressive force-transmitting contact with a load-bearing element of the top plate and the lower end of the rocker pin is in compressive force-transmitting contact with a load-receiving portion of the load cell; and a means for restricting movement to limit horizontal relative movement between the top plate and the base plate within a confined range of free play and to transmit lateral force components directly from the top plate to the base plate, thereby preventing said lateral force components from reaching the load cell, said movement-restricting means comprising:

an upper movement-restricting part rigidly connected to the top plate and in the form of a channel with channel sides having top edges attached to the top plate and with a flat channel bottom containing a passage and extending parallel to the base plate at a clear distance therefrom; and a lower movement-restricting part rigidly connected to the base plate, comprising a bolt with a shaft and a head, the bolt being anchored in the base plate with the bolt shaft passing through said passage in the channel bottom, leaving an all-around lateral clearance gap between the bolt shaft and the passage and an upward vertical clearance gap between the bolt head and the channel bottom;

wherein the cantilever arm reaches with all-around clearance into a space delimited by the top plate, the channel sides and the channel bottom.

14. A weigh module, comprising:

a cantilever load cell, having a mounting portion with a cantilever arm extending substantially horizontally therefrom and a load-receiving portion arranged at a free end of the cantilever arm;

a base plate that is substantially flat, to which the mounting portion of the cantilever load cell is rigidly attached and which serves to connect the weigh module to a supporting base;

a top plate that is substantially flat, which serves to connect the weigh module to a weighing load carrier supporting a weighing load;

a force-transmitting member arranged between the top plate and the load cell and serving to transmit a downward-directed and substantially vertical weighing force from the top plate to the load cell; and a means for restricting movement to limit horizontal relative movement between the top plate and the base plate within a confined range of free play and to transmit lateral force components directly from the top plate to the base plate, thereby preventing said lateral force components from reaching the load cell, said movement-restricting means comprising:

an upper movement-restricting part rigidly connected to the plate, and in the form of a channel with channel sides having top edges attached to the top plate and with a flat channel bottom containing a passage and extending parallel to the base plate at a clear distance therefrom; and a lower movement-restricting part rigidly connected to the base plate, comprising a bolt with a shaft and a head, the bolt being anchored in the base plate with the bolt shaft passing through said passage in the channel bottom, leaving an all-around lateral clearance gap between the bolt shaft and the passage and an upward vertical clearance gap between the bolt head and the channel bottom;

wherein the cantilever arm reaches with all-around clearance into a space delimited by the top plate, the channel sides and the channel bottom.

* * * * *

UNITED STATES PATENT AND TRADEMARK OFFICE
CERTIFICATE OF CORRECTION

PATENT NO. : 9,612,150 B2  Page 1 of 1
APPLICATION NO. : 14/427697
DATED : April 4, 2017
INVENTOR(S) : Michael Perrea et al.

It is certified that error appears in the above-identified patent and that said Letters Patent is hereby corrected as shown below:

On the Title Page

Item (54) and in the Specification, in Column 1, Lines 1-3, please delete:
"LOAD CELL WEIGH MODULE HAT LIMITS HORIZONTAL FLOATING MOVEMENT OF THE TOP PLATE"

And insert:
-- LOAD CELL WEIGH MODULE THAT LIMITS HORIZONTAL FLOATING MOVEMENT OF THE TOP PLATE --.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*